United States Patent Office 3,304,172
Patented Feb. 14, 1967

3,304,172
PROCESS FOR THE MANUFACTURE OF
LOW PHOSPHORUS PIG IRON
Erik Anders Åke Josefsson, Erik Axel Bengtsson, and
Kurt Karl Axel Almqvist, Borlange, Sweden, assignors
to Stora Kopparbergs Bergslags Aktiebolag, Falun,
Sweden, a Swedish company
No Drawing. Filed Feb. 3, 1964, Ser. No. 343,181
Claims priority, application Sweden, Feb. 7, 1963,
1,359/63
9 Claims. (Cl. 75—52)

The present invention relates to a process for the production of low phosphorus pig iron from a melt of pig iron rich in phosphorus while maintaining a high percentage of carbon in the melt.

In a reduction of phosphorus-containing iron ore with carbon in a blast furnace the phosphorus is transferred practically completely to the pig iron. Since a very large portion of the most valuable deposits of iron ore in the world contain phosphorous minerals the pig iron obtained will contain more or less, in a corresponding degree, between 0.1 and 2.0% P. The main portion of the produced pig iron is used for direct manufacture of steel. Through the development of the basic processes for the manufacture of steel of dephosphorization of the steel has, in general, found a satisfactory solution.

Nevertheless there is a considerable want for pig iron with a low content of phosphorus, on the one hand for casting and on the other hand for steel production according to the acid processes. Also the steel production in the basic arc furnace will often be facilitated by using a pig iron relatively free from phosphorus.

Many attempts have been made to develop commercially useful processes for the production of pig iron free of phosphorus. One of the best results in this respect is that obtained by the basic open-hearth process according to Hoesch which gives a phosphorus percentage as low as about 0.1% and a percentage of carbon not greater than 2%. Attempts with oxygen blowing from above and the addition of lime have given, under favourable conditions, about equal results. Blowing from above with oxygen and simultaneous stirring by blowing a gas through the melt also has been tried. Thereby, it is true, at a carbon content of 1.5% the percentage of phosphorus could be decreased to 0.03%, but at carbon contents above 2% the phosphorus content could not be depressed below 0.1%. Vigorous stirring can also be effectuated mechanically, as by using a rotary furnace or a shaking ladle, for instance according to the U.S. Patent No. 2,875,036. It has appeared, however, that in using such devices a depression of the phosphorus contents to below 0.05% will involve a depression of the carbon contents by more than 1%. Therefore, in connection with the manufacture of cast iron these processes have had to be combined with a subsequent carburization of the iron to desired percentage of carbon.

When a pig iron rich in phosphorus is treated according to the present invention it has surprisingly appeared that the phosphorus contents of the pig iron can usually be lowered to between 5% and 20% of the original percentage without noticeable depression of the carbon percentage of the pig iron. In the process according to the invention, in which the phosphorus-containing melt of pig iron is subjected to vigorous stirring in a basically lined vessel with the addition of oxygen, such as air enriched in oxygen or commercially pure oxygen gas, from above, and oxide iron material, such as ore concentrate, a carbonaceous material, such as coke, and slag formers capable of binding phosphorus, i.e. with a high content of lime, a layer of solid reduction agent, carbonaceous material, is maintained on top of the slag and a FeO percentage of about 3.5–10%, preferably about 6% is maintained in the slag. The carbonaceous material, which is preferably granular and predominantly—suitably at least 90% thereof—has a grain size less than 30 mm., is preferably supplied in such amounts that a layer of a thickness of 1–10 cm., e.g. about 5 cm., is formed on the bath surface and onto this bath there is then fed, preferably continuously, separately or in mixture, a lime-containing material, preferably burnt lime, iron oxides, e.g. iron ore concentrate, and a carbonaceous reduction agent while blowing-in oxygen above the bath and simultaneously stirring.

The dephosphorizing effect is obtained also when the slag is more or less solid. From a practical point of view, however, particularly in order to facilitate the slap tapping, it is preferred to make the slag fluid, preferably highly fluid. For this purpose fluxing agent, e.g. fluor spar and/or silicate of lime can be added, if desired.

The burnt lime, which may with advantage have a grain size below 5 mm., will substantially act as slag former for the silicon and phosphorus removed in the refining of the pig iron and its quantity is accommodated to these constituents and the percentages of silica and phosphoric acid in the other additions. The fluxing agent may serve partly for making the slag highly fluid at the high CaO activity, which is important for an efficient removal of phosphorus, for which purpose fluor spar may be used, partly as a dissolving and diluting agent for the difficultly soluble calcium phosphate, for which purpose slags of the type silicate of lime may be used. When concentrates rich in iron oxide and having a low content of gangue are used, slags of the steel furnace and blast furnace types may thus be added as fluxing agents, particularly when the prevailing content of phosphorus is at the same time relatively high in comparison with the percentage of silicon, e.g. when P/Si is equal to 0.4. The addition of basic steel furnace slag reduces somewhat the need of lime and oxides in the form of iron ore.

Through the continuous supply of iron oxides in form of disintegrated iron ore to the slag the contents of silicon, manganese and phosphorus of the pig iron are oxidized in the order mentioned. Already while passing through the layer of reduction agent a portion of the iron oxides is reduced. Therefore, the iron oxides must be supplied at such a rate that the required percentage of at least 3.5% FeO, preferably 6.0% FeO is maintained in the slag.

The main object of the oxygen gas blown in is, preferably completely, to burn the carbon monoxide formed by the reaction between the iron oxides and the reducing agent, but it is used, if desired, to a small extent also for burning a portion of the carbonaceous material for the purpose of maintaining the bath temperature, which shall be between 1250 and 1400° C. and preferably within the range of temperature of 1300–1350° C. For this purpose the oxygen gas shall be blown carefully over or against the bath without substantially penetrating the layer of solid carbonaceous reduction agent. In processing in a 2–3 ton (metric) shaking ladle it has appeared suitable to use a distance of the nozzle above the stationary bath of at least 40 cm. at a flow rate of 3 nm.³/min. (normal cubic meters per minute) and to blow the oxygen gas perpendicularly against the bath through a water cooled tuyere having a nozzle opening of 25 mm.

The carbonaceous reduction agent supplied has the essential object of counteracting decarbonization of the pig iron during the refining. Furthermore, by the aid of the layer of reduction agent on top of the slag, the content of iron oxide in the slag is kept at an even and relatively low level, at the most 10% FeO, and preferably about 6% FeO. A relatively low content of iron in the slag is essential for avoiding the over cooking which is difficult to

|  | Experiment I | | Experiment II | |
| --- | --- | --- | --- | --- |
|  | Before treatment | After treatment | Before treatment | After treatment |
| Pig iron, weight, kg | 1,388 | 1,433 | 2,700 | 2,798 |
| Temperature, °C | 1,200 | 1,270 | 1,195 | 1,275 |
| Analysis of pig iron, percent: | | | | |
| C | 3.93 | 3.75 | 4.09 | 4.02 |
| Si | 0.68 | | 0.98 | |
| Mn | 0.53 | 0.02 | 0.67 | 0.02 |
| P | 0.837 | 0.052 | 0.610 | 0.114 |
| Analysis of slag, percent: | | | | |
| CaO | | 46 | | 36 |
| MgO | | 1.6 | | 5.2 |
| $SiO_2$ | | 31 | | 28 |
| $P_2O_5$ | | 7.1 | | 8.8 |
| FeO | | 6.0 | | 7.0 |
| Additions: | | | | |
| Lime, kg./ton | 54 | | 35 | |
| Coke, kg./ton | 90 | | 59 | |
| Concentrate, kg./ton | 144 | | 93 | |
| Oxygen, nm.³/ton | 90 | | 81 | | manage and is caused by high iron contents. Furthermore the yield of pig iron increases with decreasing iron oxide percentage in the slag.

The amount of iron oxides is, in general, accommodated to the contents in the pig iron of silicon, manganese and phosphorus, but in order to urge the phosphorus refining to as low values as possible, the iron oxides are supplied in some excess. During the closing phase of the treatment this excess of iron oxides will be practically completely reduced by the carbon in the layer of reduction agent on the slag. The output of pig iron can be raised further by continued addition of iron oxide together with reduction agents and such a quantity of lime as will be needed for binding the free silica and phosphate possibly present in the additions in a slag with a basicity not lower than 0.9, expressed as $CaO/SiO_2+P_2O_5$.

The phosphorus refining effect of the slag can be increased at the end of the treatment if the iron oxide contents of the slag are increased by moderating the stirring and/or by a quicker feed of the iron oxides. A reduced stirring will cause a slower reduction of the iron oxides by the carbon in the reduction layer.

After the treatment the greater part of the slag formed is poured off, while the layer of the carbonaceous material and a small amount of the slag are held back in the vessel. The pig iron is then tapped, preferably through a special tapping hole below the slag and the carbon bearing layer is held back.

It is essential for the present invention that an efficient and controllable stirring can be provided. A shaking ladle, e.g. according to the U.S. Pat. No. 2,875,036 will be satisfactory. In principle the same course of reaction is obtained if the pig iron is treated in a rotary furnace. For operating on a relatively small scale, however, it is cheaper and more convenient to use a shaking ladle.

As example of carrying out the invention two experiments will be described herein below, both carried out in a dolomite lined ladle, where the stirring was carried out with a shaking device according to the U.S. Pat. No. 2,875,036. As slag former lime with a grain size less than 4 mm. was used in these experiments.

The refining agent was magnetite concentrate with a grain size less than 3 mm., a Fe content of 66.5% and a silica content of 6%.

The reduction agent consisted of coke having a grain size less than 20 mm. Furthermore, in the first experiment 200 kg. of preheated calcium silicate slag were added before the experiment, while in the second experiment 150 kg. of a cold calcium silicate slag were added during the experiment.

The results appear in the following schedule.

What we claim is:

1. Process for the dephosphorization of pig iron containing phosphorus while maintaining a high percentage of carbon therein, comprising charging a melt of said pig iron into a basically lined vessel, vigorously stirring said melt, introducing into said vessel from above an oxidizing gas richer in oxygen than is air, and supplying to said melt from above iron oxide containing material, a carbonaceous material and slag formers with high contents of lime in proportions to form and maintain a basic slag layer located on said melt having a FeO content within the range 3.5–10% and a layer of solid carbonaceous material on top of said slag layer.

2. Process according to claim 1, in which said basic slag is kept in fluid state.

3. Process according to claim 1, in which the temperature of said melt is maintained between 1250° C. and 1400° C. by burning the carbon monoxide formed by the reduction of the iron oxides in said slag and said solid carbonaceous material.

4. Process according to claim 2, in which a fluxing agent is added to said slag for maintaining the low viscosity thereof.

5. Process according to claim 4, in which said fluxing agent includes silicate of lime.

6. Process according to claim 1, in which said basically lined vessel is a shaking ladle.

7. Process according to claim 1 in which said basically lined vessel is a rotary furnace.

8. Process according to claim 1 comprising supplying said oxidizing gas downwardly into said vessel at such a velocity that it does not substantially penetrate through said layer of solid carbonaceous material.

9. Process according to claim 1, in which the iron oxide content of said slag is increased near the end period of the treatment from a lower value within said range to a higher value within said range by at least one of the steps consisting of moderating the stirring of said melt and increasing the supply of iron oxide containing material to said slag.

References Cited by the Examiner

UNITED STATES PATENTS

| 2,756,137 | 7/1956 | Kocks | 75—40 |
| 2,950,186 | 8/1960 | Allard et al. | 75—52 |
| 3,163,522 | 12/1964 | Rinesch et al. | 75—52 |
| 3,169,055 | 2/1965 | Josefsson et al. | 75—40 |
| 3,172,756 | 3/1965 | Bengtsson | 75—52 |

BENJAMIN HENKIN, *Primary Examiner.*